United States Patent [19]

Lange et al.

[11] 4,452,748
[45] Jun. 5, 1984

[54] PROCESS FOR OBTAINING A COPY DISK FROM AN ORIGINAL RECORDING CARRIED BY A MATRIX

[75] Inventors: Francois Lange; Roger Rascle, both of Paris, France

[73] Assignee: Thomson-CSF, Paris, France

[21] Appl. No.: 422,083

[22] Filed: Sep. 23, 1982

[30] Foreign Application Priority Data

Nov. 6, 1981 [FR] France ............................ 81 20854

[51] Int. Cl.³ .............................................. B29C 27/00
[52] U.S. Cl. ........................................ 264/25; 264/107; 425/810
[58] Field of Search ............... 425/810; 264/106, 107, 264/22, 25

[56] References Cited

U.S. PATENT DOCUMENTS 2,346,760  4/1944  Kleber ............................ 425/810 X
4,315,723  2/1982  Antoine ........................... 425/810 X

FOREIGN PATENT DOCUMENTS 2384404  10/1978  France .
2463474   2/1981  France .
2468456   5/1981  France .

*Primary Examiner*—Thomas P. Pavelko
*Attorney, Agent, or Firm*—Oblon, Fisher, Spivak, McClelland & Maier

[57] ABSTRACT

The invention relates to a process for obtaining information-carrying disks by moulding from a recorded matrix. The invention makes it possible to obtain a disk having a recording area and intact areas, which are separated by stop areas. The invention more particularly applies to the production of video disks and disks useable in information technology. It facilitates the installation of covers on the disks.

14 Claims, 5 Drawing Figures

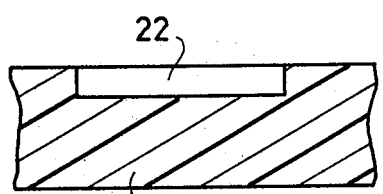
FIG. 4a
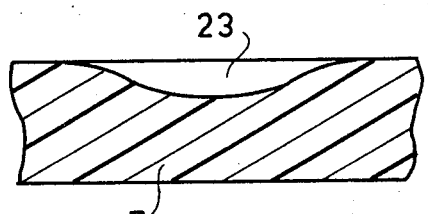
FIG. 4b
FIG. 5
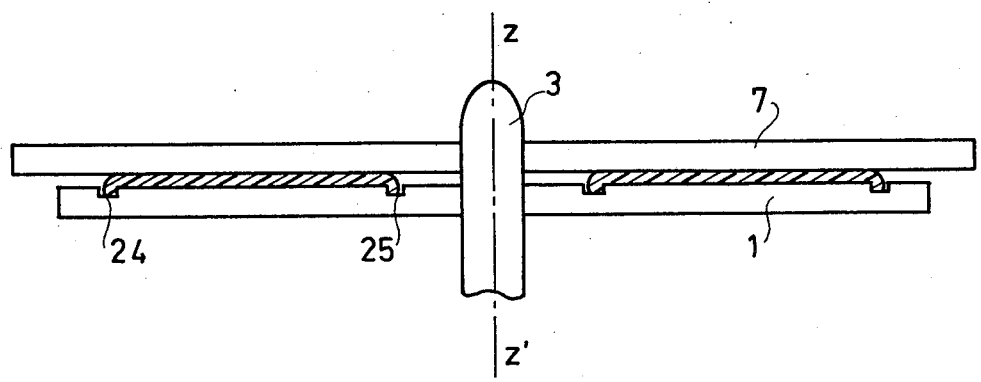

PROCESS FOR OBTAINING A COPY DISK FROM AN ORIGINAL RECORDING CARRIED BY A MATRIX

BACKGROUND OF THE INVENTION

The invention relates to the production of video disks from an original matrix having a relief, whose transfer by moulding uses a resin. The information is stored in the form of surface hollows or protruberances along a track materializing the time variation of the information-varrying signals.

The moulding processes are particularly suitable for the production of small numbers. They consist of placing between a matrix and a substrate, an intermediate moulding agent which, after solidification, supplies a countertype of the impression carried by the matrix. This moulding process introduces the idea of complementarity between the matrix and the disk, because the hollows of the one correspond to the reliefs of the other and vice versa.

The original disk carries successive tracks etched e.g. by thermal ablation in accordance with micro-pedestals. A copy disk is obtained, whose surface formed by the hardened moulding agent layer reproduces the same relief in negative, i.e. on the basis of the chosen examples microreliefs. To obviate the placing of a parting agent layer between the original disk and the hardenable substance, which is liable to be locally prejudicial to the micro-relief quality, a resin is used, which can easily be spread and which when hardened does not adhere to the original disk, but does adhere to the substrate serving as a support for it.

One production method consists of depositing the resin close to the centre of the matrix. A flexible substrate is curved and applied to the resin and is then progressively flattened against the matrix in order to displace the resin towards the periphery of the substrate. The resin is then polymerized, e.g. by ultraviolet radiation. The curve or contour can be obtained with the aid of a system comprising a support ring supporting the substrate on its periphery and a vertically movable, elastically deformable cushion which makes it possible to exert a progressive pressure on the substrate, as described in French Patent Application No. 79.22300 filed by the applicant.

As a result of this process, the resin covers the surface of the matrix and any excess resin forms a flange on the outer edge of the matrix. Towards the centre of the device, the excess resin can flow back into the space between the centering projection of this device and the substrate. If the resin excesses are polymerized, they can constitute attachment points making mould removal more difficult or destroy the central bore of the substrate. Furthermore, all or part of the irregularly shaped flange remaining attached to the substrate can be prejudicial to the subsequent use of the disk.

If polymerization of the edges of the matrix is avoided, e.g. by using removable covers, the remainder of the unpolymerized resin must then be cleaned and may make the recording area dirty. The cleaning of polymerized or unpolymerized resin excesses is in any case a tedious operation.

In addition, numerous applications require the protection of the recorded area by means of a cover fixed to the substrate by joints located outside the recorded area. A plastic cover can, for example, be stuck or welded to the substrate. However, it is difficult to produce these joints, due to the presence of a resin layer on one or other of the surfaces to be assembled.

In order to obviate these disadvantages, it is proposed to produce information-carrying disks in such a way that all the resin used is polymerized and remains on the substrate after mould removal, without forming a resin flange with uncontrolled dimensions. This can be obtained by small stop areas collecting the excess resin.

BRIEF SUMMARY OF THE INVENTION

The present invention therefore relates to a process for obtaining an information-carrying disk, the information being in the form of surface micro-zones in an annular recording area, by moulding from an original recorded matrix, consisting of transferring to a substrate the impression of the original disk by means of a substance spreading between said substrate and the original disk, the substance adhering to the substrate during its hardening, wherein the recording area extends between inner and outer intact areas, the separating between the recording area and the intact areas being provided by stop areas, and wherein substance excesses are contained by the stop areas.

BRIEF DESCRIPTION OF THE DRAWINGS

The invention is described in greater detail hereinafter relative to non-limitative embodiments and the attached drawings, wherein show:

FIGS. 4a and 4b partial sectional views of a substrate level with the grooves.

FIG. 5 a sectional view of a disk during production.

DETAILED DESCRIPTION OF THE PREFERRED EMBODIMENTS

Figure 1:
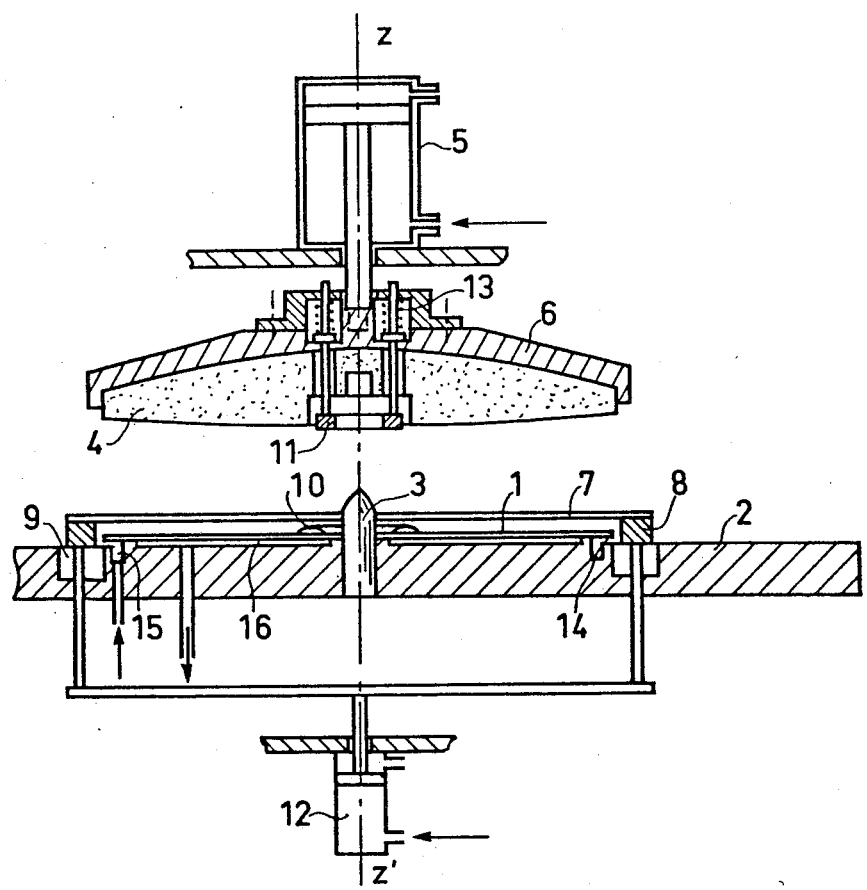
FIG. 1 a phase in the production of a disk according to the prior art.

FIG. 1 shows a phase in the production of a disk from a semirigid substrate according to the prior art.

Before arriving at the stage illustrated in FIG. 1, the following operations have been performed: disks 1 and 7 have been aligned by very careful centering. The surface of the original disk 1 can be made from metal or a synthetic material. The copy disk having a larger diameter than disk 1 is produced in a plastic substrate 7, e.g. made from polyvinyl chloride, plexiglas or glass. This substrate must be transparent to ultraviolet radiation. A depression device keeps disk 1 on turntable 2. Disk 1 has been previously centrally perforated by a hole having a predetermined diameter and centred as precisely as possible with respect to the information-carrying track. Turntable 2 is integral with a central pin 3, whose dimensions are adapted to those of the hole, with a very small tolerance (approximately 10 microns) and on which rests disk 1. The axes of the two disks coincide in ZZ'.

This is followed by the deposition of a predetermined quantity of resin on the central part of the disk 1 following a circular flange 10 located just on this side of the minimum recording area. In the case of a plastic substrate, the resin chosen can be an acrylic resin formed from monomers, which can be rapidly polymerized by ultraviolet radiation. Disk 7 is then placed above the resin flange in such a way that it bears on a ring 8 external of disk 1 and raised with respect to the level of turntable 2.

Following these preliminary operations, the assembly is placed in the axis of a device, which will be used for spreading the resin. This device comprises an alveolar foam cushion 4 placed in a seat 6 and formed, for example, by natural rubber or elastomer in the axis of the central pin and above disks 1 and 7. The cushion serves to transmit a pressure to the substrate 7 in the recording area. The assembly of the seat and the cushion is kept above disk 1 by means of a double-acting jack 5, which controls the descent of cushion 4 along axis ZZ'. Ring 8 can be retracted into a recess 9 made in turntable 2, e.g. by means of a jack 12. On the descent of the cushion, the latter centrally engages substrate 7, so as to crush the resin flange 10. Ring 8 leads to a curving of the substrate. The cushion starts to deform as from its central part and displaces the resin towards the outside. The support ring 8 progressively drops, whilst decreasing the curvature of the substrate, until the latter is completely flattened in the matrix plane. At the end of the spreading phase, the face of the cushion in contact with the substrate becomes flat and ensures a pressure over the complete surface of the latter. A central pressing ring 11 placed in a cavity of the cushion and subject to the action of springs 13 exerts a pressure on the centre of disk 7 and, in cooperation with ring 8, ensures the relative positionings of the two disks throughout the spreading phase. Ring 11, having a slightly smaller diameter than the minimum recording diameter, comes into action as from the start of the spreading phase and displaces the resin towards the outside. At the end of this phase, a rest time is necessary in order to enable any surplus resin to flow towards the outside of the matrix into recess 9. A peripheral slot 14 is provided in the turntable in the vicinity of the matrix and issues into a circular groove 15, in which there is a slight overpressure, in order to move the resin towards the recess 9 and prevent it from entering the depression chamber 16 located between plate 2 and disk 1.

The next phase consists of exposing the assembly supported by turntable 2 to the light supplied by an ultraviolet lamp. To protect the excess resin in recess 9 from irradiation, a masking screen is placed above the said recess. Following irradiation, the screen is removed and the support ring 8 rises under the action of jack 12 so as to bring about the separation of substrate 7 to which the resin adheres.

The production of copy disks according to this process introduces a supplementary operation, namely the masking operation. It is also necessary to clean recess 9. In order to be able to place a cover on the copy disk, it is necessary to have a resin-free surface having a sufficient extension, so that it can stop the advance of the resin in the immediate vicinity of the periphery of the recorded area. In this case, the margin provided between the edge of the matrix and the periphery of the recorded area can be used for producing the joint. However, it must be ensured that too much space is not lost, thereby reducing the recorded area. The disadvantages referred to hereinbefore are removed by providing concentric stop areas on the disk.

Figure 2:
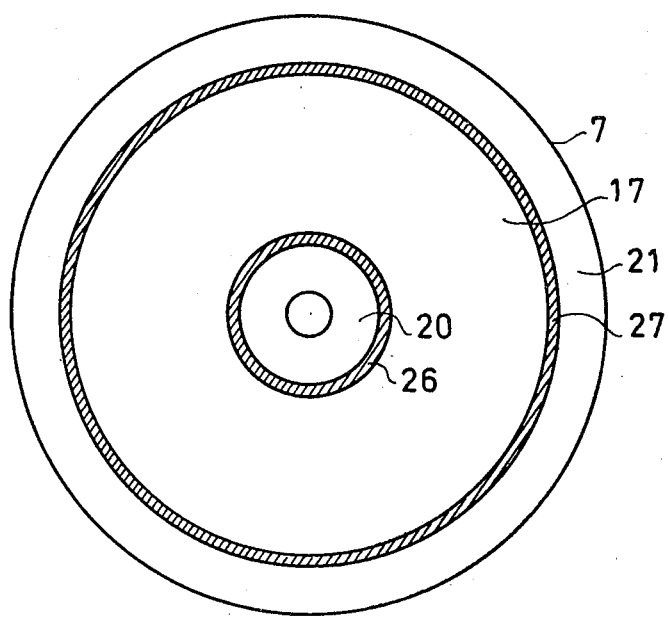
FIG. 2 a plan view of a copy disk according to the invention.

FIG. 2 is a plan view of a copy disk according to the invention. On substrate 7 of said disk, it is possible to see the recording area 17 extending between inner area 20 and outer area 21. The separation between the recording area and areas 20 and 21 is provided by stop areas 26 and 27.

Figure 3:
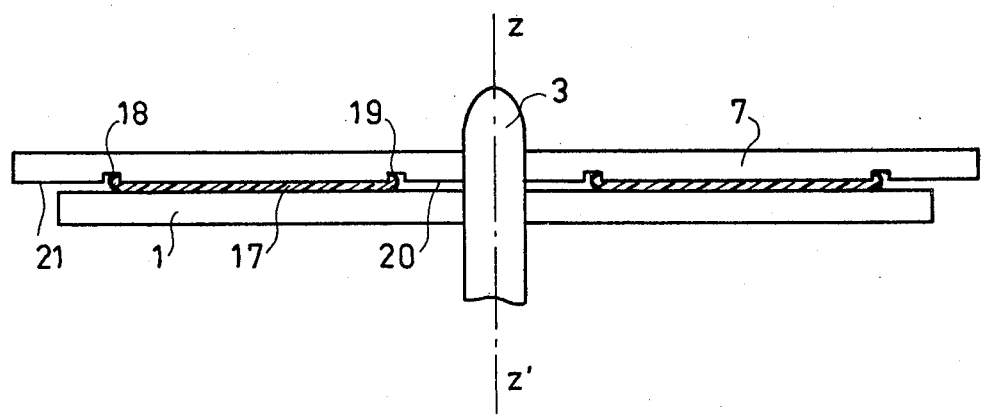
FIG. 3 a sectional view of a disk according to the invention during production.

FIG. 3 is a sectional view of a disk according to the invention during production. Only pin 3, original disk 1 and substrate 7 have been retained from FIG. 1. The moulding phases up to the flattening of the resin are the same as hereinbefore. It is possible to see that two circular grooves 18, 19, which are concentric to axis ZZ' and of limited depth are formed in substrate 7. These grooves make it possible to collect the excess resin resulting from the flattening operation, so that they form stop areas. Following this operation and the resin hardening operation, performed in this case without a mask, the copy disk has a recorded area 17 delimited by two concentric grooves 18, 19 and two resin-free rings 20, 21. The presence of groove 19 prevents the excess resin close to pin 3 from filling the clearance existing between said pin and substrate 7. As a result of their presence, grooves 18 and 19 by collecting the excess resin moved towards the outer edge and towards the centre of the substrate, contribute to the formation of rings 20 and 21, which could receive the joints permitting the installation of a cover.

The width and depth required for the grooves are dependent on the excess resin quantity to be collected, i.e. the accuracy of the dosing of the deposited resin flange, uncontrolled thickness variations in the resin layer, the geometrical quantities of the substrate and of the matrix. The width of the grooves can be between 1 and 3 mm and the depth between 0.1 and 0.3 mm. Excessively deep grooves will reduce the mechanical resistance or strength of the copy disk.

FIGS. 4a and 4b show two examples of possible profiles for the grooves. It is possible to have a rectangular cross-section, in the manner shown in FIG. 4a in which groove 22 is made in substrate 7, but it is preferable for the groove to have a rounded shape, like groove 23 made in substrate 7 and shown in FIG. 4b. The latter solution has the advantage of facilitating mould removal and of reducing to a lesser extent the mechanical strength of the substrate. It is advantageous to polish the surface of the groove so as not to disturb the ultraviolet luminous flux used for polymerizing the resin.

It also falls within the scope of the invention to make grooves in the matrix and not in the substrate of the copy disk. FIG. 5 is a sectional view of a disk during production and specifically at the same stage as reached in FIG. 3. It is possible to see pin 3 centred on axis zz', substrate 7 and matrix 1. In this case, two circular and concentric grooves have been made in the matrix in order to fulfil the same functions as hereinbefore, i.e. to collect the excess resin. In this case, the resin layer of the copy disk is terminated by two small flanges or beads, whose maximum thickness corresponds to the depth of the grooves. The grooves can have the same dimensions as when made on the substrate. The grooves are preferably rounded, in order to facilitate mould removal and it is advantageous to polish them in order to prevent excessive adhesion of the resin bead in the groove of the matrix during mould removal.

Other means exist for preventing polymerization of the resin in areas where this is undesirable. For example, it is possible to illuminate the limits of areas which are not to be covered by resin with a pencil of ultraviolet light, which leads to the polymerization of the resin as soon as the latter reaches the fixed limit.

Another way consists of depositing on the area of the disk or matrix, or both at once, which is not to be covered by the resin, a layer of a material preventing the fixing of the resin to the substrate, e.g. a layer of silicone or polytetrafluoroethylene (PTFE).

It is optionally possible to provide a groove for collecting the excess resin with both these two methods.

Thus, the invention makes it possible to provide copy disks, which are free from resin or any other substance serving the same function in areas where it is not required. It also makes it possible for the copy disks to easily receive a cover. More particularly, it obviates the operations of masking and cleaning resin excesses.

What is claimed is:

1. A process for obtaining an information-carrying disk, the information being in the form of surface microzones in an annular recording area, by moulding from an original recorded matrix, which comprises:

spreading a substance between a substrate and an original disk so as to transfer to said substrate an impression of said original disk;

adhering said substance to said substrate during hardening of said substrate wherein said recording area extends between inner and outer intact areas of said substrate, said substrate having at least one recessed stop area formed therein;

seperating the recording area and the intact areas by said at least one stop area; and containing all excesses of said substance by said stop area upon said transfer of said substrate of said impression of said original disk.

2. A process according to claim 1, further comprising causing said substance to flow under the action of a pressure force between said substrate and said original disk.

3. A process according to claim 1, wherein said at least one stop area further comprises at least one concentric circular collecting groove formed in said substrate outside said recording area for collecting said excesses of said substance.

4. A process according to claim 3, wherein said groove further comprises a groove having a rounded profile.

5. A process according to claim 3, wherein said groove further comprises a groove having a polished surface.

6. A process according to claim 1, wherein said substance is photopolyemerizable and wherein at least one pencil of ultra-violet light defines a spreading area of said substance.

7. A process according to claim 1, which further comprises covering areas not covered by said substance with a material so as to prevent fixing of said substance to said substrate.

8. A process of obtaining an information-carrying disk, the information being in the form of surface microzones in an annular recording area, by moulding from an original recorded matrix, which comprises:

spreading a substance between a substrate and an original disk to as to transfer to said substrate an impression of said original disk;

adhering said substance to said substrate during hardening of said substrate wherein said recording area extends between inner and outer intact areas of said substrate, said original disk having at least one recessed stop area formed therein;

separating the recording area and the intact areas by said at least one stop area; and containing all excesses of said substance by said stop area upon said transfer to said substrate of said impression of said original disk.

9. A process according to claim 8, further comprising causing said substance to flow under the action of a pressure force between said substrate and said original disk.

10. A process according to claim 8, wherein said at least one stop area further comprises at least one concentric circular collecting groove formed in the original disk outside said recording area for collecting said excesses of said substance.

11. A process according to claim 8, wherein said groove further comprises a groove having a rounded profile.

12. A process according to claim 8, wherein said groover further comprises a groove having a polished surface.

13. A process accoring to claim 8, wherein said substance is photopolymerizable and wherein at least one pencil of ultra-violet light defines a spreading area of said substance.

14. A process according to claim 8, which further comprises covering areas not covered by said substance with a material so as to prevent fixing of said substance to said substrate.

* * * * *